United States Patent [19]

Van Note

[11] 4,302,328
[45] Nov. 24, 1981

[54] GEOTHERMAL BRINE TREATMENT

[75] Inventor: Robert H. Van Note, Orinda, Calif.

[73] Assignee: Envirotech Corporation, Menlo Park, Calif.

[21] Appl. No.: 34,084

[22] Filed: Apr. 27, 1979

Related U.S. Application Data

[63] Continuation of Ser. No. 945,160, Sep. 25, 1978, abandoned.

[51] Int. Cl.³ .............................. C02F 1/52; C02F 1/60
[52] U.S. Cl. ...................................... 210/714; 23/301;
203/7; 203/10; 159/DIG. 13; 210/737;
210/738; 210/800
[58] Field of Search .............. 210/37 R, 42 R, 45–47,
210/49, 51, 52, 56, 57, 66, 83, 195.1, 195.3;
252/8.55 B; 166/244 C, 310; 423/339; 203/7,
10; 159/DIG. 13; 60/641

[56] References Cited

U.S. PATENT DOCUMENTS

| | | | |
|---|---|---|---|
| 2,307,466 | 1/1943 | Noll et al. | 210/56 |
| 2,401,924 | 6/1946 | Goetz | 210/46 |
| 2,429,316 | 10/1947 | Green | 210/46 |
| 2,979,442 | 4/1961 | Badger | 210/46 |
| 3,583,910 | 6/1971 | Stoddard | 210/46 |
| 3,757,516 | 9/1973 | McCabe | 166/244 C |
| 3,782,468 | 1/1974 | Kuwada | 166/310 |
| 3,951,794 | 4/1976 | Swearingen | 60/641 |
| 4,016,075 | 4/1977 | Wilkins | 210/42 R |
| 4,032,460 | 6/1977 | Zilch et al. | 252/8.55 B |
| 4,059,156 | 11/1977 | Berg | 166/244 C |

OTHER PUBLICATIONS

Chem. Abstr., "Silica Scale Formation in Simulated Geothermal Brine", vol. 80:52260f (1974).

*Primary Examiner*—Benoit Castel
*Attorney, Agent, or Firm*—Michael Pollock; Hal Bohner

[57] ABSTRACT

A process is provided for treating spent geothermal brine to remove silica. The process includes introducing the brine into the reaction zone of a reactor-clarifier and allowing the brine to flow therefrom into the clarification zone of the reactor-clarifier. In the clarification zone, particles settle from the brine and are urged to the center of the tank beneath the reaction zone, and the settled particles are drawn upwardly into the reaction zone by an impeller. The particles mix with the brine in the reaction zone to form a substantially uniform distribution therein to provide nuclei for silica precipitation from the brine. A stream of sludge is removed from the bottom of the reactor-clarifier and disposed of.

25 Claims, 3 Drawing Figures

GEOTHERMAL BRINE TREATMENT

This is a continuation of Application Ser. No. 945,160, filed Sept. 25, 1978, now abandoned.

BACKGROUND OF THE INVENTION

1. Field of the Invention

The invention relates to removal of solids from liquid and, more particularly, to a process for removing of solids, particularly silica, from spent geothermal brine.

2. Description of the Prior Art

In view of rising costs for fossil fuels and the realization that supplies of such fuels are exhaustible, increasing attention has been focused on the earth's heat as a source of energy. Brine in subterranean rock formations or aquifers under certain geological conditions can reach high temperatures. The geothermal energy in this brine can be productively utilized, and it has been estimated that geothermal resources in the United States alone could produce 140,000 megawatts of power over a life expectancy of 30 years. This is enough energy to meet the needs of about 140 million people in the United States at current levels of electrical power consumption.

In one known process for the production of electrical energy from geothermal sources, brine under pressure is delivered from geothermal wells at temperatures ranging from 400°–700° F. and pressures of 200 –450 psia to a flash tank in which steam is flashed from the brine. The flashed steam is used to run steam turbines to generate electrical energy. A major problem associated with this process is the disposal of the resulting spent brine.

Spent geothermal brines are characterized by high concentrations of dissolved solids, including high concentrations of silica ($SiO_2$). For example, in the Imperial Valley of California, the brines in the Niland Basin have total dissolved solids concentrations of up to 220,000 ppm (parts per million) and those in the Heber Region have total dissolved solids concentrations of aproximately 20,000 ppm. In comparison, seawater generally has a total dissolved solids concentrations of about 30,000 ppm. Both types of brines from the Imperial Valley have high silica concentrations in the range at 500–700 ppm, and geothermal brines from other geographical regions also contain high concentrations of silica.

In the subterranean geothermal aquifers, the geothermal brine is at temperatures ranging up to about 700° F., and the dissolved solids are at equilibrium in the brine. However, after flashing the brine to atmospheric pressure and lower temperatures (about 200° F. to about 230° F.) to produce steam, the spent brine is supersaturated with silica. For example, the equilibrium concentration of silica in brine at 200° F. is about 180 ppm; since the actual concentration can be as high as 700 ppm, the brine is often supersaturated. The presence of silica in this supersaturated condition results in the formation of scale, containing primarily silica, in the wells and related equipment thereby hindering satisfactory disposal of the spent brine.

According to one disposal method the spent brine is pumped through reinjection wells which return the spent brine to the same aquifers from which the hot brine is removed. This method is often preferred over other disposal techniques because it is both cost-effective and environmentally sound. It is cost-effective in that it reduces overall disposal costs and at the same time increases the production life of the geothermal source. It is environmentally sound in that large areas of land need not be dedicated to unsightly brine storage ponds, potential subsidence of agricultural land is prevented, and the release of odors often associated with geothermal waters is controlled.

However, because of the extreme scale-forming characteristics of the spent brine, deposited solids must be periodically removed from the reinjection wells. This results in both increased downtime and increased operating costs. In order to prevent such solids deposition, spent brine must be treated prior to reinjection to produce a stable solution. That is, the concentration of dissolved silica in the brine which is to be reinjected must be reduced to at or below its saturation level at equilibrium.

One proposed method of reducing the dissolved silica concentration is spent geothermal brine is to add ammonium hydroxide to the brine to raise its pH. This method is taught in U.S. Pat. No. 4,016,075. According to the patent the hot brine is treated with ammonium hydroxide in a reaction chamber and then transferred to flash tanks. The ammonium hydroxide raises the pH of the brine and reacts chemically with dissolved aluminum and ferrous ions to from a gelatinous sludge of aluminum and ferrous hydroxides; silica is captured in the gelatinous sludge. From the flash tanks the spent brine is transferred to a settling tank wherein the sludge is allowed to settle from the brine and the silica thereby removed. Part of the resulting sludge is transferred to disposal, and part can be returned to the reaction chamber. According to the patent, the ammonium hydroxide is added to raise the pH of the brine from its normal pH of about 5.0 to a pH preferably about 6.6 to form the gelatinous sludge. Also according to the patent this pH adjustment requires the added ammonium hydroxide solution to be about 1.5 percent by volume of the total brine solution.

OBJECTS OF THE INVENTION

A primary object of the present invention is to provide a process for effectively reducing the concentration of dissolved solids, particularly silica, in spent geothermal brine.

More particularly, it is an object of the present invention to provide a process for reducing the concentration of silica in spent geothermal brine without the addition of chemicals.

Further objects and advantages of the present invention can be readily ascertained by reference to the following description and appended drawings, which are offered by way of illustration only and not in limitation of the invention, the scope of which is defined by the appended claims and equivalents to the structure, materials and acts recited therein.

DESCRIPTION OF THE PREFERRED EMBODIMENT

The present invention relates to a process in which solids, especially silica, in spent geothermal brine are precipitated under controlled conditions in the presence of previously precipitated solids and without the addition of chemicals. Treatment of the geothermal brine is carried out at its original pH, and no chemicals are added to the brine. The process results in a treated brine having a silica concentration at or below the saturation level and, thus, substantially reduces or eliminates the scaling problems normally associated with reinjection of geothermal brine into wells.

According to the present embodiment, geothermal brine is introduced into flash tanks where steam is flashed from the brine. Thereafter the spent brine is introduced into a conventional reactor-clarifier for treatment. The following description of a reactor-clarifier is offered by way of illustration, and it should be understood that solids-contact clarifier devices other than a reactor-clarifier could be utilized, as will be discussed hereinafter.

Figure 1:
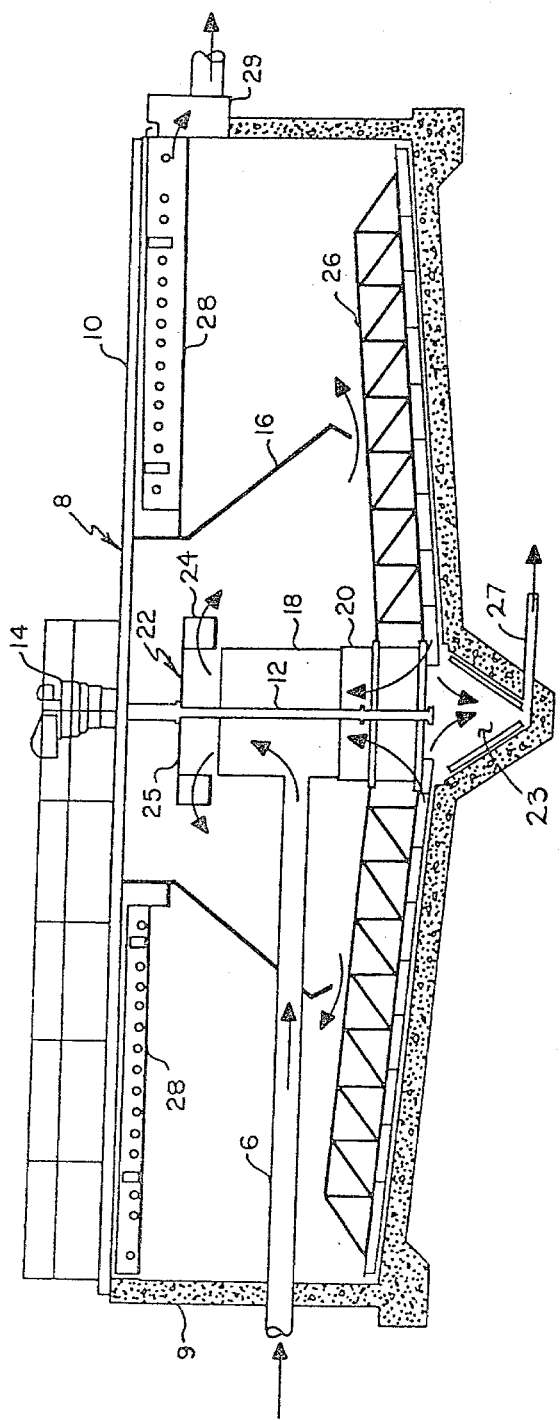
FIG. 1 is a diagram showing partially cut-away a reactor-clarifier utilized in the process of the invention.

With reference to FIG. 1, spent brine is introduced via conduit 6 into the illustrated reactor-clarifier 8. This illustrated reactor-clarifier 8 is manufactured by the EIMCO Division of Envirotech Corporation. The reactor-clarifier 8 includes a cylindrical tank 9 with a bridge structure 10 fixed across its top. A vertically disposed column 12 is mounted in the center of the tank 9 to be rotatable on bearing means, not shown, at the bottom of the tank. The column 12 is driven to rotate by a drive system 14, usually of the variable-speed type, mounted on the bridge 10. Fixedly mounted to the bridge 10 is a hollow, skirt-shaped reaction well 16. The reaction well 16 defines a reaction zone generally interior thereof and a clarification zone generally exterior thereof. The lower edge of the reaction well 16 is spaced above the floor of the tank 9 to provide substantial clearance between the well 16 and the bottom of the tank 10 for liquid flow as indicated by the arrows. A hollow, cylindrical recirculation drum 18 is fixedly mounted to the influent conduit 6. The recirculation drum is disposed concentric with the reaction well 16, and the upper edge of the recirculation drum 18 is substantially below the top of the reaction well with the lower edge of the recirculation drum 18 located at about the level of the lower edge of the reaction well 16. A hollow cylindrical member 20 is rotatably mounted in sealing relationship with the lower edge of the recirculation drum 18, and the lower edge of the cylindrical member 20 is located above the bottom of the tank to carry liquid from the lower region of the tank 9 and upward through the recirculation drum 18.

An impeller 22 is mounted from the bridge structure 10 and affixed to the variable-speed drive means 14. The impeller 22 includes a plurality of arms 25 and blades 24 located immediately above the recirculation drum 18. The blades 24 are affixed to arms 25 to rotate therewith to draw liquid upwardly through the recirculation drum 18 and thence into the upper region of the reaction well 16.

Rake arms 26 are mounted to the center column 12 to rotate and force material on the floor of the tank to a central sludge sump 23. A withdrawal conduit 27 is connected to the bottom of the sludge sump 23 to permit removal of settled sludge. Radially-disposed launders 28 are located at the top of the tank to collect treated brine and convey it to collection box 29 mounted at the periphery of the tank 19.

In operation of the illustrated reactor-clarifier 8, particles of material settle to the bottom of the tank 9 to form sludge, and the rotating rake arms 26 urge the sludge to the center of the tank. Brine is introduced into the reaction drum 18 via conduit 6, while large volumes of the sludge are recirculated upward through the recirculation drum 18 by impeller 22 into the reaction well 16. Precipitated solids recirculated in this manner come in intimate contact with brine in the recirculation drum 18 and the reaction well 16 providing seed nuclei on which solids precipitate from the brine under controlled conditions of reaction time and solids concentration. The resultant liquid-solids mixture flows from the reaction well 16 into the tank 10 where solid particles settle under the influence of gravity and treated, clarified liquid rises. The liquid overflows into the collection launders 28 and thence is discharged from the reactor-clarifier. The rake arms 26 rotate to move the settled sludge to the center of the tank where part of the sludge is drawn upwardly through the recirculation drum 18, and the remainder is discharged via conduit 27.

In practice it has been found that this process can be initiated by producing an inventory of precipitated solids in the reactor-clarifier without the addition of foreign chemicals. To begin the process, spent brine is continuously introduced into the reactor-clarifier. The reactor-clarifier is then operated substantially as it is during the process described above, but no sludge is discharged. Operation is continued until a solids concentration of about 2.5% by weight in the reaction well has been established. Tested brines have required that this initial start-up period be continued for about 10 days until the desired solids concentration is achieved. However, once a sludge inventory has been developed, it can be held in storage, either in the reactor-clarifier or separate storage means during any shut down so that the desired solids concentration can be quickly achieved upon start-up.

It should now be appreciated that the reactor-clarifier 8 permits the maintenance of a substantially uniform dispersion of solids in contact with the brine in the reaction well 16. The concentration of solids can be controlled by regulating the impeller speed; higher impeller speed results in higher concentration of solid particles in the reaction well 16.

It should now be understood that other known solids-contact clarifier means can be substituted for the reactor-clarifier 8. Such other solids-contact clarifier means include the common feature with the reactor-clarifier 8 in that these devices all permit the maintenance of a controllable concentration of solid particles dispersed in a liquid.

As discussed above, in the silica removal system, taught in U.S. Pat. No. 4,016,075, ammonium hydroxide is continuously added to the brine to adjust the pH and to create a gelatinous sludge of aluminum and ferrous hydroxides to capture the silica. By way of contrast, in the process of the present embodiment, no chemicals need be added to the spent brine and the pH is not substantially altered.

Tests of the illustrated system have shown that in practice the concentration of silica in the treated, clarified brine is reduced to at or below the saturation level when the solids concentration in the reaction well is maintained at about 2.5% (25,000 ppm) solids by weight.

Figure 2:
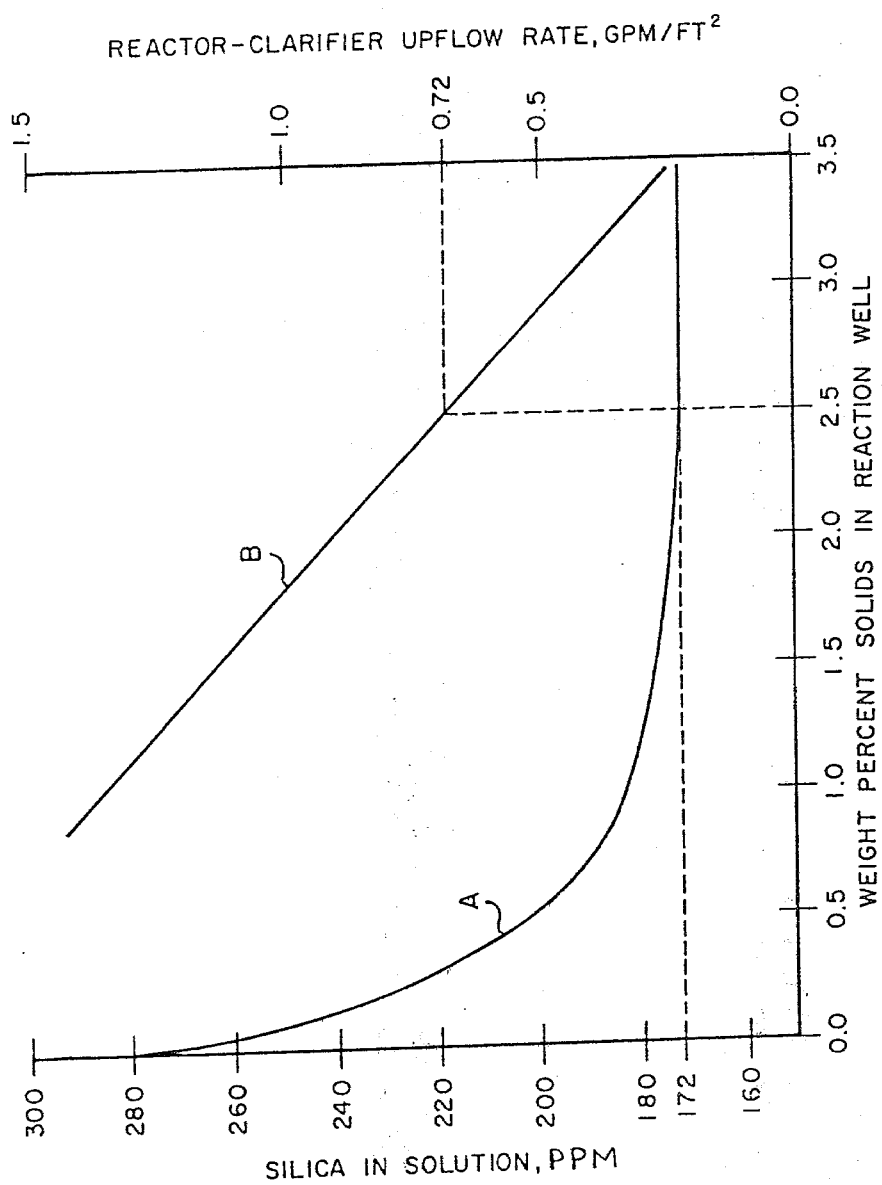
FIG. 2 is a graph of operating parameters according to the present process.

Turning to FIG. 2, this figure shows the results of tests conducted using an eight-foot diameter reactor-clarifier. In my tests I have found that the concentration of silica in solution is inversely related to the concentration of solid particles in the reaction well. This is shown by curve A. I have also found that the concentration of solid particles in the reaction well is inversely related to the upflow rate in the reactor-clarifier. This is indicated by curve B. The upflow rate is the rate brine is introduced into the reactor-clarifier, via line 6, divided by the area of the reactor-clarifier; this is normally expressed in gallons per minute per square foot (GPM/ft$^2$). Referring still to FIG. 2, I have determined that the optimum concentration of solid particles in the reaction well is 2.5 percent by weight. When this concentration is maintained, the concentration of dissolved silica is reduced to about 172 ppm while the upflow rate is maintained at about 0.72 GPM/ft$^2$. When the concentration of solid particles was reduced below 2.5 percent the concentration of dissolved silica increased above 172 ppm and the treated brine became super-saturated. On the other hand, increasing the concentration of solids above about 2.5 percent resulted in no appreciable reduction in the concentration of dissolved silica, but required a reduction in upflow rate.

In practice, the time of contact, or residence, in the reaction well should be carefully controlled. I have found that the contact time should be about 15 minutes when the solids concentration in the reaction well is about 2.5% and the temperature of the liquid is about 200°–230° F. A skilled worker will appreciate that this contact time can be calculated by dividing the volume of the reaction well by the rate at which brine is introduced thereinto.

It has been found that the pH of the brine is not substantially altered by treatment in the illustrated reactor-clarifier. Tested brines have been found to have a pH of about 5.6 before and after treatment in the reactor-clarifier.

Test results indicate the importance of the precipitation reaction occurring in the presence of a uniform dispersion of previously precipitated solids. Tests have shown that the time required to reduce the concentration of silica to below 180 ppm is about 15 minutes when a substantially uniform dispersion of about 2.5% solids is maintained in the reaction well. By contrast, several hours are necessary to reduce the concentration of silica in spent brine to below 180 ppm if precipitated solids are allowed to settle from the brine and not maintained in a uniform dispersion throughout the brine.

In summary, the operating parameters utilized in the working example discussed above are the following:
Influent Brine Temperature: 200°–230° F.
Solid Particle Concentration in Reaction Well: 2.5%
Contact Time in Reaction Well: 15 minutes
Upflow Rate in Reactor-Clarifier: 0.72 GPM/ft$^2$ Chemical analysis of the solids in a tested reactor-clarifier sludge show that the silicon concentration in the settled sludge is about 92% solids by weight reported as SiO$_2$, or about 43% reported as silicon. The majority of the silicon is believed to be present as silica, although silica complexed with such chemicals as calcium can also be present. The concentration of calcium is less than about 10%, and the concentration of magnesium is less than one percent. The concentration of hydroxide compounds such as magnesium and calcium hydroxide in the sludge is negligible. It is believed that the minerals dissolved from the subterranean geothermal aquifiers under high pressure and temperature are re-solidified under the controlled conditions of the process herein described to re-form the natural minerals.

Figure 3:
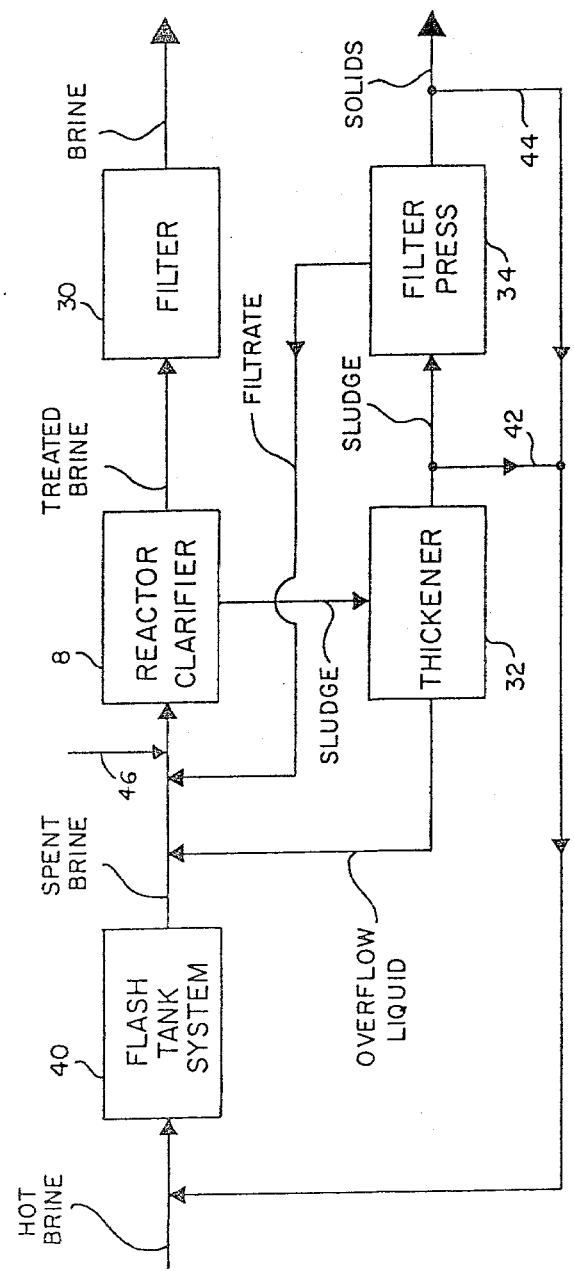
FIG. 3 is a schematic flow sheet of the system of the invention.

Referring now to FIG. 3, the overflow from the reactor-clarifier 8, which contains dissolved silica in concentrations which are substantially non-scale forming, is polished in a filter 30 to remove suspended solids which may be present. Use of a conventional sand-anthracite filter for this purpose has proven effective. It should be recognized that other conventional ways and means for removing suspended solids can also be employed to remove solids. Following this solids-removal step, the treated geothermal brine is reinjected back to the aquifiers.

The sludge removed from the reactor-clarifier 8 has a suspended solids concentration of preferably about 4.5% solids by weight. Tests have shown that this sludge can be dewatered to produce a cake of about 65% solids by weight. In practice, one method for dewatering to the 65% solids level comprises treating the sludge in a conventional thickener 32 to achieve a solids concentration of about 10% and then treating the sludge from the thickening device in a conventional filter press 34 to achieve the 65% solids level. Preferably both the overflow from the thickening device and the filtrate from the filter press are recirculated to the reactor-clarifier 8. The filter cake from the filter press 34 can be disposed of as land fill or further processed to recover the minerals contained therein.

Optionally, a portion of the sludge from the filter press 34 or the thickening device 32 or from both devices can be recycled to the flash tank system 40, via lines 42 and 44. It is believed that such recirculation would reduce any scale formation in the lines, valves and tankage of the flash tank system.

In practice approximately 20% of the hot brine is flashed off as steam in the flash tank system 40. It is believed that external sources of water in quantities equal to the steam production can be blended with the treated spent brine prior to well reinjection in order to insure that the quantity of hot brines removed is equal to the quantity of re-injected liquid. Thereby any subsidence of the land will be prevented. However, an external source of water will generally be quite dissimilar in chemical composition and temperature to the treated spent brine. Thus it is believed that blending the two streams after treatment of the spent brine would probably result in an unstable product for reinjection. Therefore, any make-up water should be added to the untreated spent brine via line 46 and the mixture co-treated in the reactor-clarifier.

I claim:

1. A process for rapidly reducing the concentration of silica in spent geothermal brine at ambient pressure and at a temperature not greater than about 230° F. by treating the brine in a tank having a reaction zone and a clarification zone wherein no chemicals need be added to the spent brine to enhance removal of the silica, said process comprising:
   a. introducing the spent geothermal brine into the reaction zone of the tank;
   b. allowing the spent geothermal brine to flow from the reaction zone to the clarification zone of the tank so that solid particles containing silica settle from the brine in the clarification zone to form a body of settled silica-containing particles in the lower part of the clarification zone;

c. removing silica-containing particles from the body of settled particles and mixing the removed particles with the brine in the reaction zone to maintain a substantially uniform distribution of particles of controlled concentration in the reaction zone with the concentration of particles being less than about 3.5% by weight in the reaction zone, thereby to provide seed nuclei to precipitate particles;

d. removing treated brine from the upper part of the clarification zone; and e. removing settled particles from the body of particles and discharging the removed particles from the tank.

2. The process of claim 1 wherein the removed solid particles are mixed with the brine such that the concentration of solid particles in the reaction zone of the tank is maintained at between about 2% and about 3% by weight.

3. The process of claim 1 wherein the treatment process is accomplished without treating the brine with hydroxides of magnesium, calcium, iron or ammonium.

4. The process of claim 1 wherein the contact time in the reaction zone is about 15 minutes.

5. The process of claim 1 wherein the upflow rate in the reactor-clarifier is about 0.72 GPM/ft$^2$.

6. The process of claim 1 wherein the solid particles are controllably mixed with the brine so that the concentration of solid particles in the reaction zone is about 2.5% by weight.

7. The process of claim 1 wherein the pH of the spent geothermal brine is not substantially altered during the process.

8. The process of claim 7 wherein the pH of the spent geothermal brine is less than about 6.0.

9. The process of claim 8 wherein the pH of the spent geothermal brine is about 5.6.

10. The process of claim 1 wherein the temperature of the brine is about 180° F. to about 230° F.

11. The process of claim 1 wherein the concentration of silica in the particles is at least fifty percent reported as $SiO_2$.

12. The process of claim 1 wherein the concentration of silica in the particles is about ninety percent reported as $SiO_2$.

13. A process according to claim 1 further including transferring hot geothermal brine from an aquifer into flash tank means to flash steam from the hot brine to produce the spent brine and introducing the spent brine from said flesh tank means into the reaction zone of the tank.

14. A process according to claim 13 further including recycling solid particles removed from said tank to said flash tank means.

15. A process according to claim 13 further including removing additional solid particles from said treated brine.

16. A process according to claim 13 further including introducing water into said tank in a quantity substantially the same as the quantity of water flashed from the hot geothermal brine as steam.

17. A process for rapidly reducing the concentration of silica in spent geothermal brine at ambient pressure and at a temperature not greater than about 230° F. without the necessity of adding chemicals to cause precipitation of silica from the brine by treating the brine in a tank having a reaction zone and a clarification zone, said process comprising:

a. introducing the spent geothermal brine at a temperature between about 180° and about 230° F. into the reaction zone of the tank at a rate so that the upflow rate in the clarification zone is about 0.72 GPM/ft$^2$;

allowing the spent geothermal brine to flow from the reaction zone to the clarification zone of the tank so that solid particles containing silica settle from the brine in the clarification zone to form a body of settled particles in the lower part of the clarification zone;

c. removing particles from the body of settled particles by impeller and reaction drum means;

d. controllably introducing the removed particles into the brine in the reaction zone to maintain a substantially uniform concentration of particles in the reaction zone with the concentration of particles being less than about 3.5% by weight in the reaction zone, thereby to provide seed nuclei to precipitate particles;

e. removing treated brine from the upper part of the clarification zone; and f. removing settled particles from the body of particles and discharging the removed particles from the tank.

18. The process of claim 17 wherein the pH of the spent geothermal brine is not substantially altered during the process.

19. The process of claim 18 wherein the pH of the spent geothermal brine is less than about 6.0.

20. The process of claim 19 wherein the pH of the spent geothermal brine is about 5.6.

21. The process of claim 17 wherein the concentration of silica in the particles is at least fifty percent reported as $SiO_2$.

22. The process of claim 21 wherein the concentration of silica in the particles is about ninety percent reported as $SiO_2$.

23. The process of claim 17 wherein the removed solid particles are introduced into the brine in the reaction zone such that the concentration of solid particles in the reaction zone of the tank is maintained at between about 2% and about 3% by weight, and with the contact time in said zone being about 15 minutes.

24. A new process for using a reactor-clarifier of the type having a tank, a reaction well disposed in the center of the tank, a reaction drum disposed in the center of the reaction well, an impeller rotatably mounted to draw particles upward through the reaction drum from the lower portion of the tank and mix the particles with brine in the reaction well, wherein no chemicals need to be added to the brine to enhance removal of silica, said new process comprising:

a. introducing spent geothermal brine into the reaction drum, the brine being at ambient pressure and at a temperature not greater than about 230° F.;

b. impelling the spent geothermal brine to flow into the reaction well and thence into the tank outside the reaction well so that solid particles containing silica settle from the brine;

c. impelling settled particles to flow into the reaction well to mix with the brine in the reaction well to form a substantially uniform distribution of particles of controlled concentration at less than about 3.5% by weight in the reaction well, whereby seed nuclei are provided to precipitate particles;

d. removing treated brine from the upper part of the tank; and e. removing settled particles from the tank.

25. The process of claim 24 wherein no chemicals are added to alter the pH of the spent brine.

* * * * *